United States Patent [19]
Foster

[11] 3,981,511
[45] Sept. 21, 1976

[54] DISPENSING CART

[76] Inventor: Lawrence Foster, 11 Ogden Road, Scarsdale, N.Y. 10583

[22] Filed: Feb. 12, 1975

[21] Appl. No.: 549,288

[52] U.S. Cl.............................. 280/79.3; 211/150
[51] Int. Cl.² ........................................... B62B 5/00
[58] Field of Search.......................... 280/79.3, 79.2; 186/1 B, 2, 4; 211/150, 151, 128, 49 D

[56] References Cited
UNITED STATES PATENTS

| | | | |
|---|---|---|---|
| 1,561,548 | 11/1925 | Karpenko | 280/79.2 |
| 2,686,599 | 8/1954 | Beard | 211/150 |
| 2,916,293 | 12/1959 | Lang | 280/79.3 |
| 3,272,528 | 9/1966 | Young | 280/79.3 |

Primary Examiner—M. H. Wood, Jr.
Assistant Examiner—John A. Carroll
Attorney, Agent, or Firm—Harold L. Stults; Pasquale A. Razzano

[57] ABSTRACT

A dispensing cart for use in supporting food packages in a cooking and thawing oven, and for further use in dispensing the packages to the consumer, includes a main frame on which a plurality of shelves are pivotally mounted for movement between a first horizontal position and a second inclined position which is tilted towards one side of the main frame. In the horizontal position of the shelves, the cart can be inserted in an oven adapted to receive the cart while in the tilted position of the shelves, the cart can be used to display the food packages on the shelves for selection by the consumer. Means are provided for tilting all of the shelves on the cart simultaneously when it is desired to display and distribute the packages on the cart shelves.

14 Claims, 7 Drawing Figures

U.S. Patent  Sept. 21, 1976  Sheet 1 of 2  3,981,511
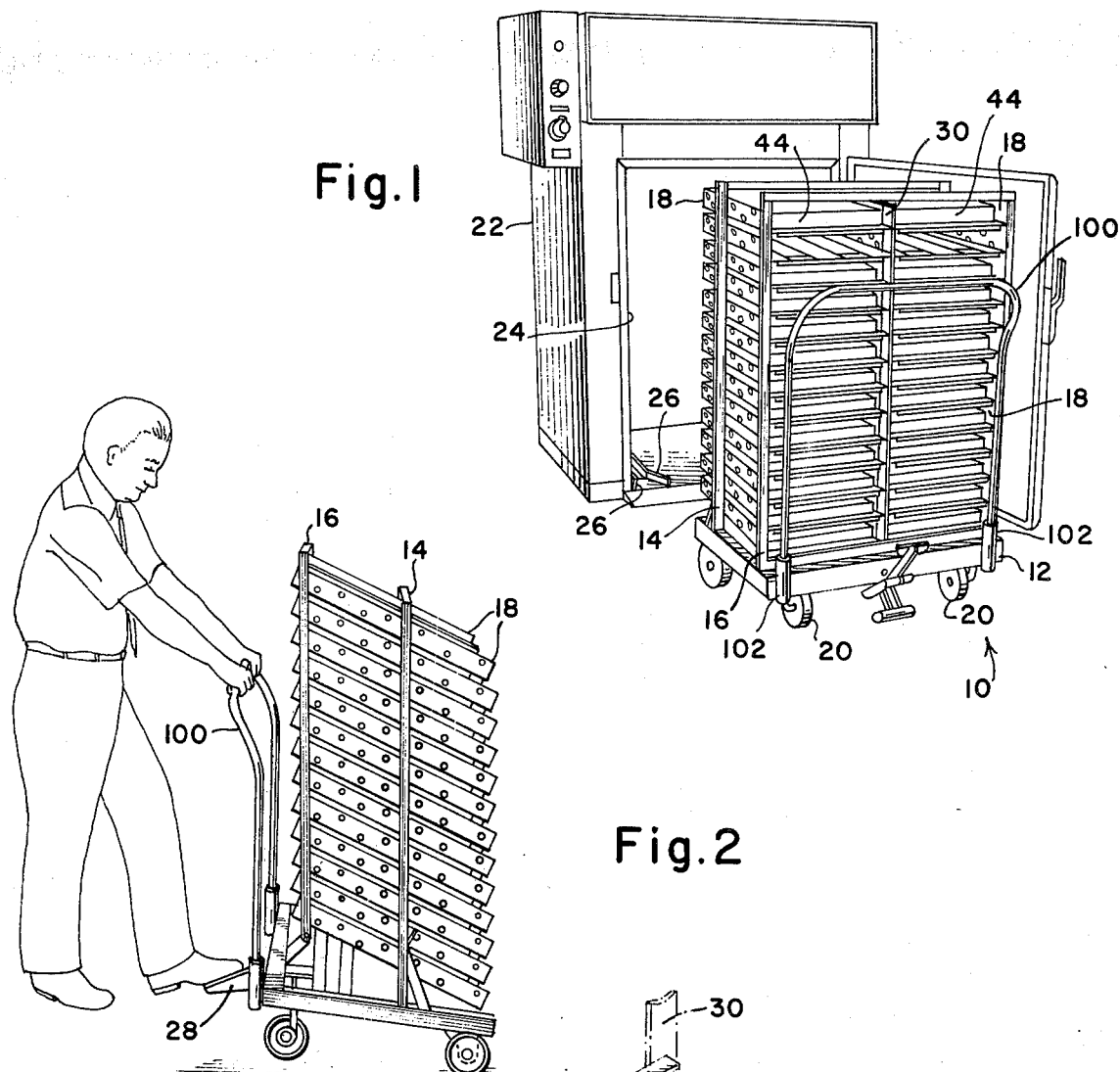
Fig.1
Fig.2
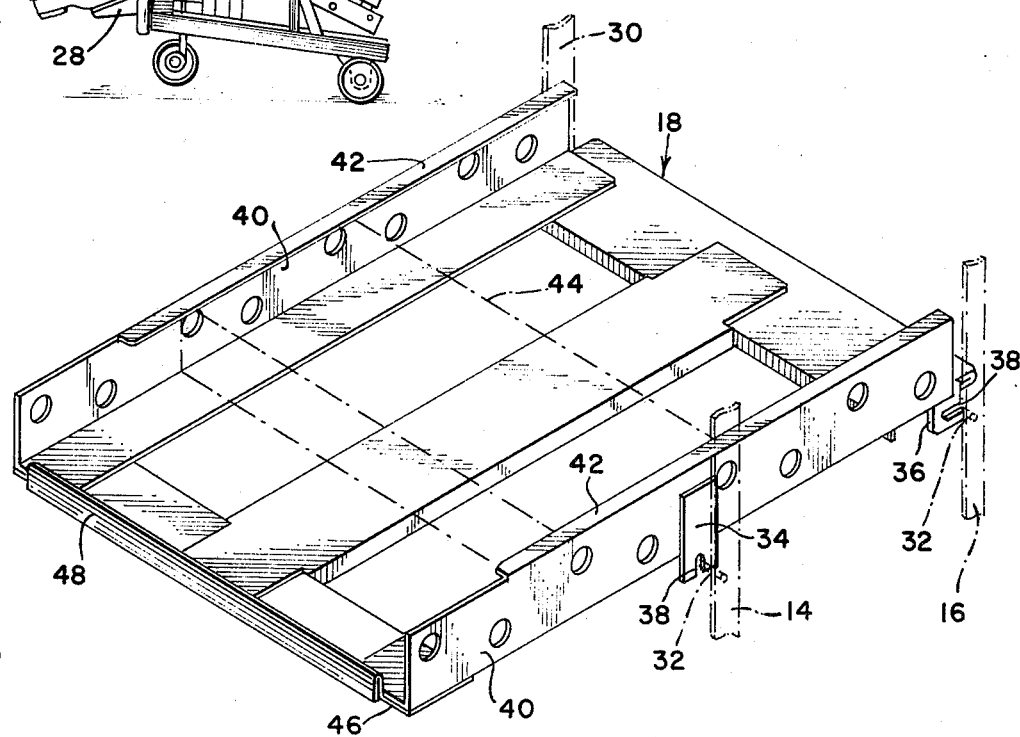
Fig.3

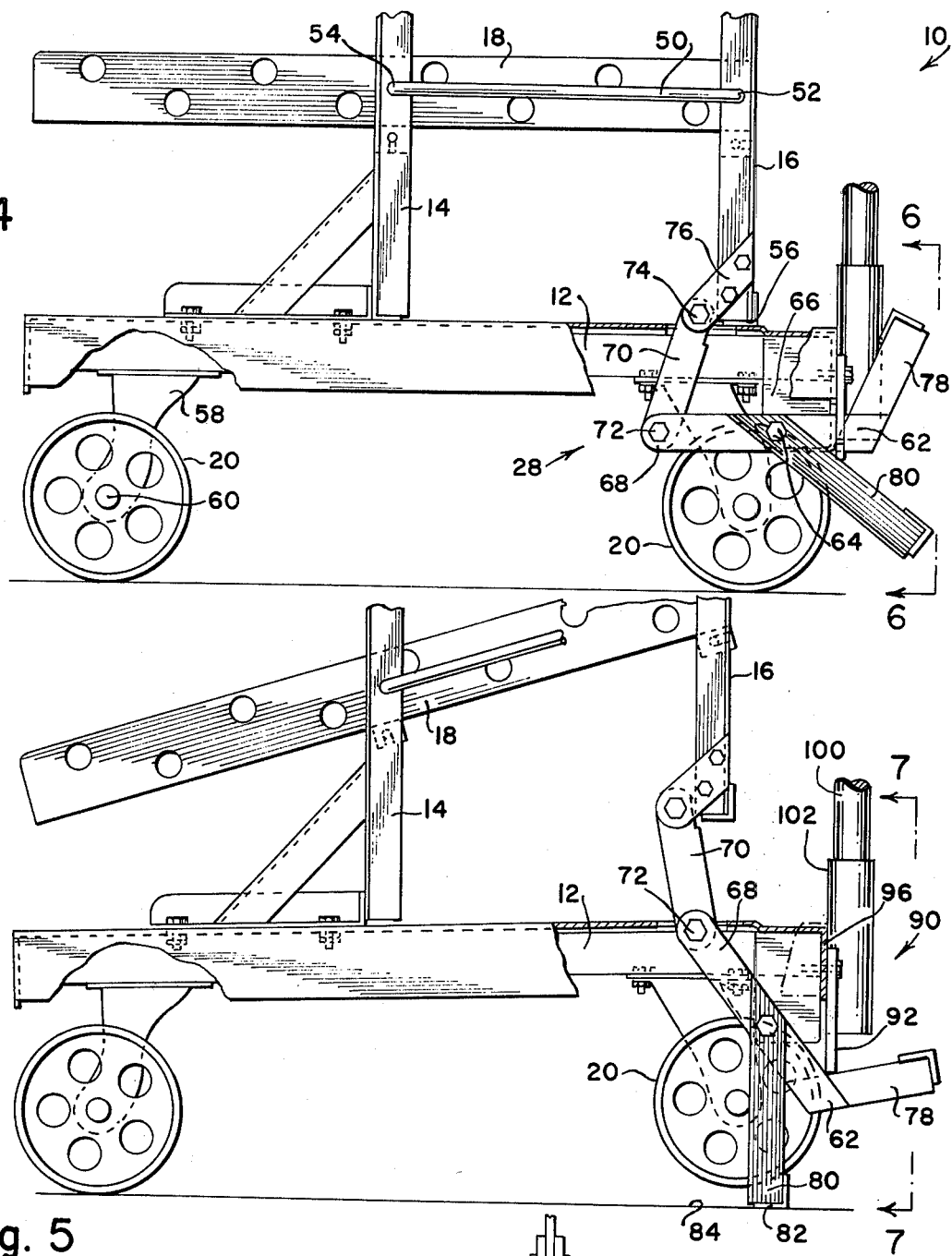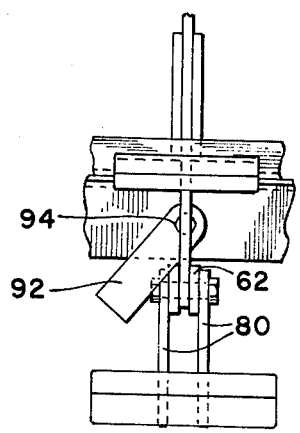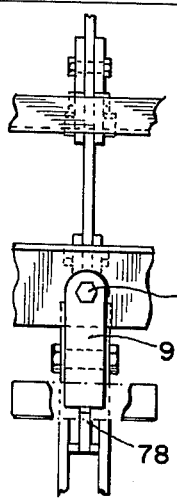

DISPENSING CART

The present invention relates to carts for transporting packages and the like, and more particularly to a cart having a plurality of shelves movable between selected horizontal and inclined positions.

In the preparation and sale or distribution of packaged food products, for example, in school lunch programs, hospitals and the like, the food product normally is supplied in a cold or frozen state, with each portion or serving in a separate package. These packages therefore must be first thawed and/or cooked in an oven and then set out on display for selection by the consumers. This process requires multiple handlings of the individual food packages, and a substantial amount of labor. These handling problems are overcome, and the amount of labor required in such food service establishments is substantially reduced, by the cart arrangement of the present invention which is used for both the thawing operation of the frozen food products and also for displaying the products for selection.

It is an object of the present invention to provide a dispensing cart for food products which can be used both as a support rack in a thawing and cooking oven, and as a display rack for the cooked products.

Another object of the present invention is to provide a dispensing cart which is relatively simple and economical in construction.

A still further object of the present invention is to provide a dispensing cart which is durable in construction and simple to operate.

A still further object of the present invention is to provide a multi-purpose cart for use in food service establishments, schools, hospitals and the like.

In accordance with an aspect of the present invention, a dispensing cart is provided with a wheeled base on which at least first and second vertically extending frame members are mounted. Preferably one of the frame members is rigidly secured to the base, while the other of the frame members is connected to the first frame member by a parallelogram-type linkage which allows the second frame member to move vertically, but in parallel relation with respect to the first frame member. A plurality of shelves are pivotally connected to these frame members, and the pivotal connection of the shelves may themselves form the parallel linkage connecting the two frame members. Alternatively, separate parallelly connected links can be provided between the frame members.

In either case, means are provided for selectively raising and lowering the movable frame member with respect to the fixed frame member, thereby moving the shelves between a horizontal position and a tilted or inclined position. In the horizontal position of the shelves, the entire cart can be rolled directly into a large oven for thawing and cooking frozen food products on the shelves. When the thawing and cooking operation is completed, the wheeled cart can be removed from the oven and placed on the display or distribution line, with the shelves in the tilted position to facilitate removal of the products therefrom. In the tilted position of the shelves the food packages will gravitate towards the lower edge of the shelves as other packages are removed therefrom. In this manner, no physical handling of the food packages are required between the oven and the display or distribution line.

The above, and other objects, features and advantages of this invention, will be apparent in the following detailed description of an illustrative embodiment of the invention which is to be read in connection with the accompanying drawings, wherein:

FIG. 1 is a perspective view of a cart constructed in accordance with one embodiment of the present invention and illustrated in connection with an oven with which the cart can be used;

FIG. 2 is a perspective view illustrating the cart with the shelves thereon in their tilted or dispensing position;

FIG. 3 is an enlarged perspective view of one of the shelves used in the cart illustrated in FIGS. 1 and 2;

FIG. 4 is an enlarged elevational view, with parts broken away, of the lower portion of the cart in FIG. 1, showing the mechanism used to move the shelves from their horizontal to their tilted position;

FIG. 5 is a side elevational view, similar to FIG. 4, showing the shelves of the cart in the tilted position;

FIG. 6 is a partial rear view taken along lines 6—6 of FIG. 4; and

FIG. 7 is a rear view similar to FIG. 6, and taken along lines 7—7 of FIG. 5.

Referring now to the drawing in detail, and initially to FIG. 1 thereof, it will be seen that a cart 10, constructed in accordance with the present invention, includes a base 12 and a pair of frame members 14, 16, on which a plurality of shelves 18 are mounted. Shelves 18 are pivotally mounted on frame members 14, 16, and the frame member 16 is movable with respect to frame member 14 so that the shelves can be tilted from the horizontal position shown in FIG. 1 to the tilted position thereof shown in FIG. 2.

Preferably, cart 10 is supported on a plurality of wheels 20 so that it can be conveniently rolled or moved from place to place. With the shelves 18 of the cart in a horizontal position, the cart can be placed in an oven 22 of known construction so that packages of frozen or cold food products on the shelves 18 can be thawed and/or cooked in the oven.

Oven 22 provides an oscillating heated air flow across food packages on the cart which is inserted in the oven through the door or opening 24. The oven is preferably of the type illustrated and described in U.S. Pat. Application Ser. No. 454,777, filed Mar. 25, 1974, commonly assigned herewith and the disclosure of which is incorporated herein by reference. The oven 22 illustrated in the drawing of this application however is shown to include guide tracks 26 mounted on the floor of the oven, in order to accommodate and guide the wheels 20 of the cart 10.

After the food products on the cart 10 have been thawed and/or cooked in the oven 22, the cart can be removed from the oven and rolled to the distribution line wherein the operator, as illustrated in FIG. 2, activates a raising mechanism 28 which causes the movable frame member 16 to move upwardly with respect to the fixed frame member 14, thereby tilting the shelves 18 for distribution of the food products. In this position, as the consumers remove the lowermost package from each shelf, (i.e. the package closest to the lower edge of each shelf) the packages remaining on the shelf will slide downwardly to the lowermost position on the shelf where they can be conveniently removed.

The frame members 14, 16 are generally rectangularly shaped peripheral members, as seen most clearly in FIG. 1, and each has a vertically extending intermediate frame element 30 secured thereto. By this arrangement two individual shelves 18, can be mounted on either side of the intermediate frame members 30. Preferably the frame members 30 and each of the vertically extending portions of the frames 14, 16, are provided with pins 32 that are integrally secured thereto in any convenient manner so that the shelves 18 can be pivotally and removably mounted on the frame members.

As illustrated in FIG. 3, each shelf 18 is provided with tab members 34, 36 having slots 38 formed therein which are adapted to receive the pins 32 on the respective frame members. Both sides of the shelf 18 are provided with corresponding tabs or extensions 34, 36 for engaging similar pins 32 on the intermediate frame members 30 and the frame members 14, 16. By this arrangement, the shelves 18 can be placed in the frame members by first inserting the pins 32 of the rear frame member 16 in the slot 38 of the tab 36. The shelf can then be pivoted downwardly to engage the pin 32 of frame member 14 in the tab 38.

As can be seen most clearly in FIG. 3, the shelves 18, all of which are of identical construction, are formed of a sheet metal construction having side flanges 40 which are formed with channel extensions or flanges 42 that define an edge channel which receives the edges of food packages 44, in order to guide the packages on the shelf. The forwardmost edge 46 of the shelf can be provided with an upturned flange 48 that acts as a stop to limit the sliding movement of the food packages 44 when the shelves are in the tilted position. The side flanges 40 for the shelves are, as seen in FIG. 3, apertured in order to facilitate and allow air flow across the oven 22 during the thawing and cooking operation. This air flow consists of heated air whose direction of flow is periodically reversed, in accordance with the invention described in the above mentioned application.

Rear frame member 16 is not connected to the base 12 of the cart 10. However, it is maintained in its vertical configuration by means of a plurality of links 50 which are pivotally connected at their ends 52, 54 to the frame members 14, 16 respectively. These links are seen most clearly in FIG. 4, and it will be appreciated that there is a series of such links along the height of the cart, preferably with one link being adjacent each of the shelves 18. The links 50 thus form a parallelogram linkage connection between the frame member 16 and the frame member 14, which keeps the frame member 16 in its vertical position, but which allows relative vertical movement of the frame member 16 with respect to the frame member 14. Because of the parallelogram connection it will be appreciated that during upward and downward movement of the frame member 16 it will move towards and away from the frame member 14. In this connection it is noted that the shelves 18 also act as a portion of the parallelogram linkage and, if desired, the shelves 18 can be permanently pivotally connected to the frame members 14, 16 (as for example by rivets or the like) so that the links 50 can be eliminated. In either case the lower end 56 of the frame member 16 rests on the upper surface of the base 12 of cart 10, so that the downward movement of the frame member 16 is limited by the cart. This down position, illustrated in FIG. 4, is the position in which shelves 18 are maintained in their horizontal configuration.

As mentioned, base 12 is supported on a plurality of wheels 20. These wheels can be connected to the base in any convenient manner, as for example by conventional bearing yokes 58 connected between the bottom of the base 12 and the central axis 60 of the wheels. Of course, other convenient mounting arrangements for the wheels 20 can be provided.

In order to raise and lower the rear frame member 16 of the cart 10, the raising mechanism 28 is provided. This mechanism consists of a lever 62 pivotally mounted intermediate its ends on a pivot axis 64 which is defined by a bolt, pivot pin or the like, mounted in a portion or extension 66 of the base member 12. The inner end 68 of lever 62 is pivotally connected to a link 70 by a pivot pin 72 or the like. The opposite end of the link 70 is connected by a pivot pin 74 to the frame member 16. This connection can be achieved by means of a rigid extension 76 secured to frame member 16, as illustrated in FIG. 4.

Preferably lever 62 includes a step extension 78 which can be engaged by the operator's foot to pivot the lever 62 in a generally clockwise direction, as seen in FIG. 4. Upon pivotal movement of lever 62 in a clockwise direction the end 68 thereof will move upwardly from the horizontal position shown in FIG. 4. This upward movement of the end 68 of lever 62 will cause link 70 to urge frame member 16 in an upward direction. After a pivotal movement of approximately 60° the lever achieves the configuration of FIG. 5 wherein frame member 16 is in its raised position, causing the shelves 18 to be tilted.

In order to maintain the frame member 16 in the raised position of FIG. 5, lever 62 is provided with an arm 80 rigidly secured thereto and having a foot or base member 82. As seen in FIG. 6, arm 80 consists of two links which are rigidly connected to lever 62 (which also may be formed as two links). By this arrangement, when the lever 62 is pivoted from the position of FIG. 4 to the position of FIG. 5, the foot 82 of the arm 80 engages the support surface or floor 84 on which the cart is rolled, and when the position of FIG. 5 is achieved the flat lower surface of the foot holds the lever in the position shown. By properly dimensioning the length of the arm 80, when the lever 62 is in the position of FIG. 5, the rear wheels 20 of the cart 10 will be raised off of the support surface 84, in order to reduce the tendency of the cart to roll. Thus, the arm 80 not only serves to hold the frame member 16 in its raised position, but also prevents the cart from rolling.

In order to insure that the lever 62 does not inadvertently return to the position illustrated in FIG. 4, the raising and lowering mechanism 28 is provided with a safety device 90. This safety device simply consists of a plate 92 pivotally mounted by a bolt 94 or the like on the back surface 96 of base 12. This plate, in the raised position of lever 62 is manually pivoted to the side, as illustrated in FIG. 6, so as to allow the lever 62 to attain its horizontal position, which, in turn, is maintained by the link 70. When the lever 62 is moved to the position illustrated in FIG. 5, as for example by the operator stepping on the extension 78 of the lever, plate 92 will pivot in a counterclockwise direction, as seen in FIG. 6, under the influence of gravity, to the position in FIG. 7. In that position, the plate 92 is located over the extension 78 of the lever 62 and thus blocks and prevents movement of the lever in a counterclockwise direction should the cart be pushed forwardly or tend to roll forwardly on a sloping floor or the like. Thus the shelves 18 are maintained securely in their inclined position so that the food cartons or packages on the shelves can be readily removed therefrom.

As illustrated in the drawings, the cart 10 is provided with a handle 100 that has a generally U-shaped configuration. The lower end of the handle is inserted in sleeves 102 mounted on base 12. If desired, the handle can be removable from the sleeves 102, by a simple friction fit arrangement. This will allow the handle 100 to be removed from the cart after the cart is placed in the oven 22 so that the handle will not be heated during the thawing and cooking operation. Once the thawing operation is completed, the handle can be replaced in the sleeves 102 in order to withdraw the cart and contents from the oven for placement on the dispensing or distribution line.

Accordingly, it will be appreciated that a relatively simply constructed cart structure has been provided which can serve multiple purposes. In particular the cart will enable food packages to be heated on the cart and conveniently distributed therefrom. Preferably the cart is arranged so that the food packages or containers can be supported in a horizontal position in an oven for thawing and cooking, and later transported to a dispensing line in the same cart on which they were heated. At the dispensing line the shelves of the cart can be raised to an inclined position so as to facilitate their removal by the consumer.

Although an illustrative embodiment of the invention has been described herein with reference to the accompanying drawings, it is to be understood that the invention is not limited to that precise embodiment thereof but various changes and modifications can be effected therein without departing from the scope or spirit of this invention.

What is claimed is:

1. A dispensing cart comprising a main frame including a base, a first rigid frame member extending vertically from said base and a second frame member extending parallel to said first frame member and mounted for relative vertical movement with respect thereto; a plurality of shelves pivotally connected, in superimposed relation, to both of said frame members for movement between a first horizontal position and an inclined position tilted towards one side of the main frame, and means for raising and lowering said second frame member relative to said first frame member to move said shelves between said two positions, including a lever pivotally mounted on said base, a link pivotally connected at opposite ends to said second frame member and to said lever to raise and lower the second frame member upon pivotal movement of the lever in opposite directions, and a support arm rigidly secured to the lever and having a free end adapted to engage the support surface on which the cart is placed when the lever is moved to the position in which said second frame member is raised; said arm being dimensioned to support said base adjacent the lever in a raised position, whereby articles on said shelves will move on the shelves towards said one side of the main frame when said shelves are tilted.

2. A dispensing cart as defined in claim 1 including a plurality of wheels supporting said base.

3. A dispensing cart as defined in claim 1 including means for locking said raising and lowering means with said second frame member in a raised position relative to said first frame member.

4. A dispensing cart as defined in claim 1 wherein said second frame member is pivotally connected to said first frame member whereby said second frame member moves towards said first frame member when the second frame member is raised; said link between said second frame member and lever accommodating such movement relative to said lever.

5. A dispensing cart as defined in claim 1 including means for selectively preventing pivotal movement of said lever from the position in which said arm engages the supporting surface to a position in which said second frame member is in its lowered position relative to the first frame member.

6. A dispensing cart as defined in claim 1 wherein said arm is fixed to said lever at the pivotal connection of the lever to the base.

7. The dispensing cart as defined in claim 1 wherein said shelves each have a pair of side flanges and an end stop on the end thereof positioned adjacent said one side of the main frame to prevent articles on the shelves from sliding off when the shelves are in their tilted position.

8. A dispensing cart comprising a base having front and rear sides, a plurality of wheels secured to said base for supporting the cart on a support surface, a first frame member rigidly secured to said base between said front and rear sides thereof and extending upwardly therefrom, a second frame member located adjacent the rear side of the base extending parallel to said first frame member and being pivotally connected thereto for relative vertical movement; a plurality of shelves pivotally connected to said first and second frame members and means for raising and lowering said second frame member with respect to the first frame member thereby to tilt said shelves between horizontal and inclined positions; said raising and lowering means including a lever pivotally mounted adjacent the rear side of said base, a connecting link pivotally connected at opposite ends to said second frame member and said lever to raise and lower the second frame member upon pivotal movement of the lever in opposite directions, and a support arm rigidly secured to said lever and having a free end adapted to engage the support surface on which the cart is placed when the lever is moved to the position in which said second frame member is raised; said arm being dimensioned to support said base adjacent the lever in a raised position and said connecting link accommodating movement of said second frame towards and away from said first frame member during raising and lowering thereof.

9. A dispensing cart as defined in claim 8 wherein the pivotal connection of said shelves to said frame members form the pivotal connection between said frame members.

10. A dispensing cart as defined in claim 8 including a plurality of parallelly extending links pivotally connected between said first and second frame members forming a parallelogram link allowing said second frame member to move vertically and in parallel relation to said first frame member.

11. A dispensing cart as defined in claim 10 wherein said shelves are removably mounted on said frame members.

12. A dispensing cart as defined in claim 8 including means forming a parallelogram linkage pivotally connecting said first frame member to said second frame member.

13. A dispensing cart as defined in claim 1 including means for selectively preventing movement of said lever from its position at which it supports the second frame member in its raised position, whereby said shelves are maintained in their tilted position.

14. A dispensing cart as defined in claim 13 wherein said lever is mounted on said base in a predetermined position and held in a horizontal position by said connecting link when the shelves are in their horizontal position; said lever being pivotable, in a predetermined direction, to a generally vertical position to raise said second frame member and having a portion thereof which extends beyond the periphery of said base; said means for preventing movement of said lever including a blocking plate movably mounted on said base for selective engagement with said portion of said lever to selectively prevent movement thereof in a direction opposite to said predetermined direction.

* * * * *